US011943700B2

(12) United States Patent
Aoyagi et al.

(10) Patent No.: US 11,943,700 B2
(45) Date of Patent: Mar. 26, 2024

(54) USER DEVICE

(71) Applicant: NTT DOCOMO, INC., Tokyo (JP)

(72) Inventors: Kenichiro Aoyagi, Tokyo (JP); Hiroshi Ishikawa, Tokyo (JP); Atsushi Minokuchi, Tokyo (JP); Shinya Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/960,774

(22) PCT Filed: Sep. 12, 2018

(86) PCT No.: PCT/JP2018/033797
§ 371 (c)(1),
(2) Date: Jul. 8, 2020

(87) PCT Pub. No.: WO2019/138604
PCT Pub. Date: Jul. 18, 2019

(65) Prior Publication Data
US 2020/0336979 A1    Oct. 22, 2020

(30) Foreign Application Priority Data

Jan. 11, 2018    (JP) ................................ 2018-002998

(51) Int. Cl.
*H04W 48/20*    (2009.01)
*H04W 36/00*    (2009.01)
*H04W 48/16*    (2009.01)

(52) U.S. Cl.
CPC ....... *H04W 48/16* (2013.01); *H04W 36/0022* (2013.01); *H04W 48/20* (2013.01)

(58) Field of Classification Search
CPC . H04W 36/0022; H04W 36/14; H04W 48/18; H04W 36/04; H04W 80/10;
(Continued)

(56) References Cited

U.S. PATENT DOCUMENTS

2015/0079938 A1* 3/2015 Jung ..................... H04W 48/20
                                                                    455/411
2015/0111571 A1    4/2015 Tanikawa et al.
(Continued)

FOREIGN PATENT DOCUMENTS

JP    2013258486 A    12/2013
JP    2016527798 A    9/2016
(Continued)

OTHER PUBLICATIONS

MediaTek Inc., RAT/EPS Fallback for IMS Multimedia calls, Nov. 14-18, 2016, 3GPP SA WG2 Meeting #118, Reno, Nevada, USA (Year: 2016).*

(Continued)

*Primary Examiner* — Said M Elnoubi
(74) *Attorney, Agent, or Firm* — Osha Bergman Watanabe & Burton LLP

(57) ABSTRACT

In 5G cell (230) of 5G system (200), upon detecting that access to the 5G system (200) is barred, the 5G system (200) is congested, 5G core network (220) of the 5G system (200) does not support IMS-type communication service, or fallback to 4G system (300) is instructed, UE (100) selects 4G cell (330) of the 4G system (300) as a target cell for connection. The UE (100) transmits a connection request signal for the IMS-type communication service to the target cell for connection.

9 Claims, 9 Drawing Sheets

(58) Field of Classification Search
CPC . H04W 80/04; H04W 92/02; H04W 36/0011; H04W 36/0066; H04W 48/16; H04W 48/20; H04W 4/90; H04W 76/16; H04W 36/12; H04W 36/34; H04W 76/19; H04W 88/06; H04L 65/1016; H04L 65/1069; H04L 65/1059; H04M 2242/04; H04M 7/006; H04J 11/0093; H04N 7/147
See application file for complete search history.

(56) References Cited

U.S. PATENT DOCUMENTS

| | | | |
|---|---|---|---|
| 2016/0157170 A1 | 6/2016 | Daoud Triki et al. | |
| 2016/0374005 A1* | 12/2016 | Cho | H04L 65/1045 |
| 2018/0035342 A1* | 2/2018 | Fujishiro | H04W 36/0085 |
| 2018/0132141 A1* | 5/2018 | Huang-Fu | H04W 36/0022 |
| 2018/0220338 A1 | 8/2018 | Tabe | |
| 2018/0332428 A1* | 11/2018 | Gupta | H04L 61/1564 |

FOREIGN PATENT DOCUMENTS

| | | |
|---|---|---|
| WO | 2016163545 A1 | 10/2016 |
| WO | 2017022043 A1 | 2/2017 |

OTHER PUBLICATIONS

Of MediaTek Inc. , RAT/EPS Fallback for IMS Multimedia calls, 3GPP SA WG2 Meeting #118, Nov. 14-18, 2016, Reno, Nevada, USA (Year: 2016).*
MediaTek Inc., RAT/EPS Fallback for IMS Multimedia calls, 3GPP SA WG2 Meeting #118, Nov. 14-18, 2016, Reno, Nevada, USA) (Year: 2016).*
MediaTek Inc., RAT/EPS Fallback for IMS Multimedia calls, Nov. 2016, 3GPP SA WG2 Meeting #118, S2-166581, Reno, Nevada, USA (Year: 2016).*
MediaTek Inc., RAT/EPS Fallback for IMS Multimedia calls, 3GPP SA WG2 Meeting #118, S2-166581, Nov. 2016, Reno, Nevada, USA (Year: 2016) (Year: 2016).*
SA WG2 Meeting #118; S2-166581 "RAT/EPS Fallback for IMS Multimedia calls" MediaTek Inc.; Reno, Nevada, USA; Nov. 14-18, 2016 (8 pages).
3GPP TR 24.890 V1.0.3 "3rd Generation Partnership Project; Technical Specification Group Core Network and Terminals; 5G System—Phase 1; CT WG1 Aspects (Release 15)" Sep. 2017 (163 pages).
Extended European Search Report issued in European Application No. 18900535.8, dated Feb. 8, 2021 (12 pages).
Office Action issued in counterpart Chinese Application No. 201880085926.1 dated Oct. 12, 2021 (21 pages).
3GPP TS 24.229 V14.6.0 "3rd Generation Partnership Project; Technical Specification Group Core Network and Terminals; IP multimedia call control protocol based on Session Initiation Protocol (SIP) and Session Description Protocol (SDP); Stage 3 (Release 14)" Dec. 2017 (981 pages).
3GPP SA WG2 Meeting #S2-124; S2-179475 "Emergency services fallback" Intel, Nokia, T-Mobile USA, Charter Communications, AT&T, Comcast, Ericsson; Reno, Nevada, USA; Nov. 27-Dec. 1, 2017 (3 pages).
International Search Report issued in International Application No. PCT/JP2018/033797, dated Nov. 27, 2018 (5 bages).
Written Opinion issued in International Application No. PCT/JP2018/033797; dated Nov. 27, 2018 (4 pages).
Office Action issued in counterpart European Patent Application No. 18900535.8 dated Oct. 25, 2022 (5 pages).

* cited by examiner

USER DEVICE

TECHNICAL FIELD

The present invention relates to a user device that is capable of performing fallback from 5G system to a system other than the 5G system.

BACKGROUND ART

In the 3rd Generation Partnership Project (3GPP), specifications concerning a third generation mobile communication system (hereinafter, 3G system) using radio access technology such as Wideband Code Division Multiple Access (W-CDMA), and a fourth generation mobile communication system (hereinafter, 4G system) using a radio access technology such as Long Term Evolution (LTE)/LTE-Advanced has been stipulated (for example, see Non-Patent Document 1). Moreover, in 3GPP, specifications of a fifth generation mobile communication system (hereinafter, 5G system) as a successor system of the 4G system are being studied. The 3G system supports Circuit Switching type (CS-type) communication service, and the 4G system and the 5G system support an IP Multimedia Subsystem type (IMS-type) communication service.

Since the introduction of the 5G system, provision of communication services in which systems of a plurality of generations are used in combination is assumed for the reasons such as size of the area in which the 5G system is deployed and equipment planning. For example, in Non-Patent Document 2, when 5G core network does not support the IP Multimedia Subsystem (IMS) because of the architecture of the network, fallback from the 5G system to the 4G system is proposed.

Specifically, upon receiving an IMS-type emergency call from a user device (UE), the 5G core network instructs 5G Radio Access Network (RAN) to perform an IMS-type emergency fallback to the 4G system. Based on the instruction, the 5GRAN performs handover of or redirects the UE to the 4G system. According to the proposed solution, the emergency calls are not lost and can be processed via the 4G system.

PRIOR ART DOCUMENT

Non-Patent Document

Non-Patent Document 1: 3GPP TS 24.229 V14.6.0 Annex L (normative): IP-Connectivity Access Network specific concepts when using EPS to access IM CN subsystem, L.5 Use of circuit-switched domain, 3rd Generation Partnership Project; Technical Specification Group Core Network and Terminals; IP multimedia call control protocol based on Session Initiation Protocol (SIP) and Session Description Protocol (SDP); Stage (Release 14), December 2017

Non-Patent Document 2: Contributed Article SA WG2 Meeting #S2-124, S2-179475, 27 Nov.-1 Dec. 2017, Reno, Nevada, USA

SUMMARY OF INVENTION

However, as proposed in Non-Patent Document 2, when congestion occurs in the 5G system, processing performed to fall back to the 4G system is time-consuming. As a result, service quality of communication that requires real time performance such as emergency calls, voice communication, and video calling qdeteriorates.

Moreover, when UE cannot connect to the 4G system even after the fallback from the 5G system to the 4G system is performed, it is assumed that CS fallback from the 4G system to 3G system is further performed in accordance with the stipulations of Non-Patent Document 1.

Because, in the CS fallback, it is necessary to change the communication service from IMS type to CS type, it takes time for the LIE to connect to the 3G system. Therefore, even in the case of the CS fallback, the service quality of the communication that requires real time performance such as emergency calls, voice communication, and video calling deteriorates.

The present invention has been made in view of the above circumstances. One object of the present invention is to provide, in a radio communication system that includes a first system and a second system that support IP Multimedia Subsystem-type communication service, and a third system that supports a circuit switching-type communication service, a user device that is capable of maintaining service quality of communication that requires real time performance such as emergency calls, voice communication, and video calling even when performing fallback from the first system to any system other than the first system.

A user device (UE 100) according to one aspect of the present invention includes a system state detecting unit (system state detecting unit 150) that detects, in a first cell (5G cell 230) of a first system (5G system 200) that supports IP multimedia subsystem (IMS) type communication service, that access to the first system is barred, the first system is congested, a core network (5G core network 220) of the first system does not support the IP multimedia subsystem-type communication service, or fallback to a second system (4G system 300) that supports the IP multimedia subsystem-type communication service is instructed; a cell selecting unit (cell selecting unit 160) that selects, based on a state detected by the system state detecting unit, a second cell (4G cell 330) of the second system as a target cell for connection; and a connection processing unit (connection processing unit 120) that transmits a connection request signal (RRC CONNECTION REQUEST) for the IP multimedia subsystem-type communication service to the target cell for connection.

A user device (UE 100) according to another aspect of the present invention includes a system state detecting unit (system state detecting unit 150) that detects, in a first cell (5G cell 230) of a first system (5G system 200) that supports IP multimedia subsystem (IMS) type communication service, that access restriction information that notifies that access to the first system is barred, congestion information that notifies that the first system is congested, non-support information that notifies that a core network of the first system does not support the IP multimedia subsystem-type communication service, or fallback instruction information that instructs fallback to a second system (4G system 300) that supports the IP multimedia subsystem-type communication service is included in a message (broadcast information or paging signal) received from the first system; a cell selecting unit (cell selecting unit 160) that selects, based on a state detected by the system state detecting unit, a second cell (4G cell 330) of the second system as a target cell for connection; and a connection processing unit (connection processing unit 120) that transmits a connection request signal (RRC CONNECTION REQUEST) for the IP multimedia subsystem-type communication service to the target cell for connection.

DESCRIPTION OF EMBODIMENTS

Figure 1:
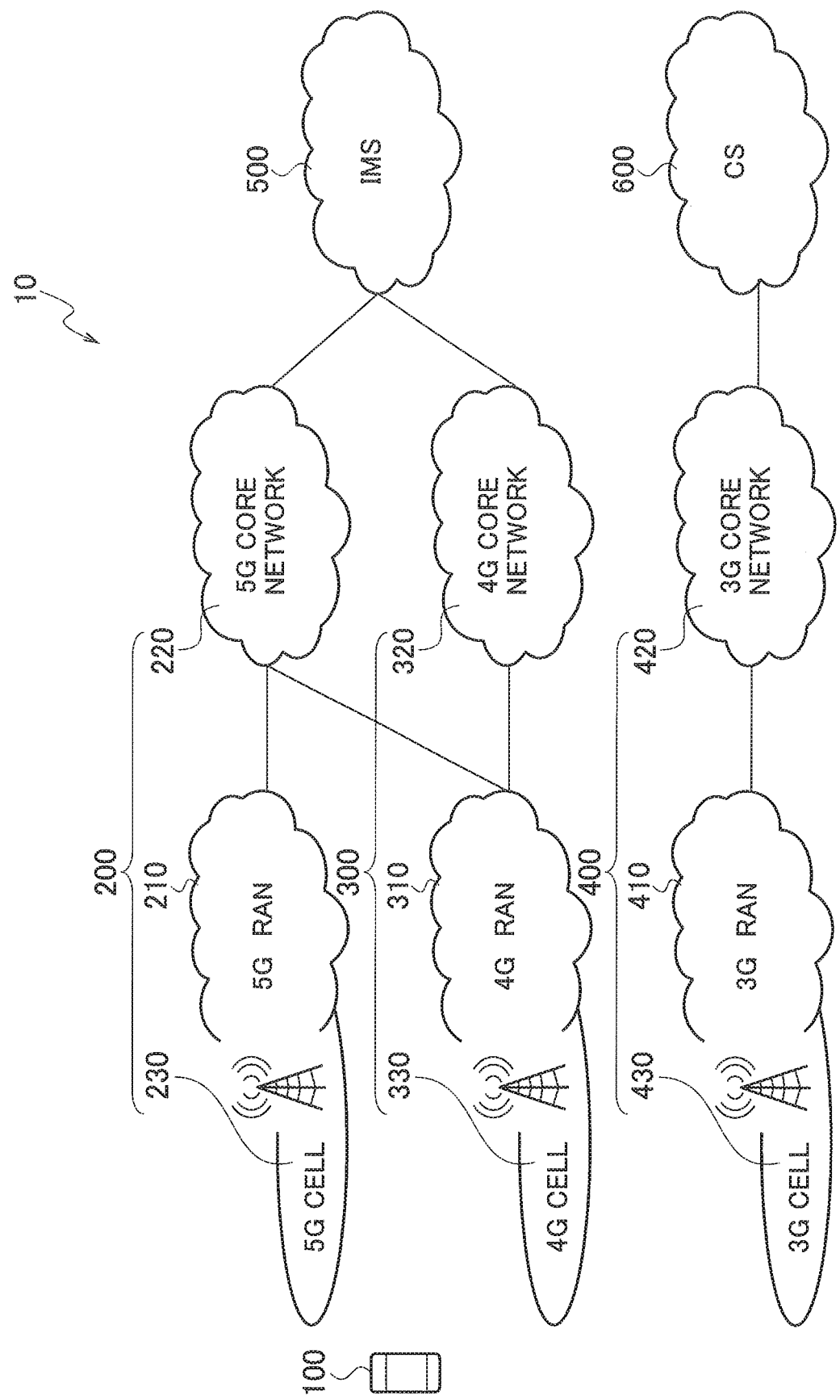
FIG. 1 is an overall structural diagram of a radio communication system 10.

Exemplary embodiments of the present invention are explained below with reference to the accompanying drawings. Furthermore, in the drawings, structural elements having the same function or configuration are indicated by the same or similar reference numerals and the explanation thereof is appropriately omitted.

(1) Overall Structural Configuration of Radio Communication System

FIG. 1 is an overall structural diagram of a radio communication system 10 according to the present embodiment. The radio communication system 10 includes a user device 100 (hereinafter, the OF 100), 5G system 200 and 4G system 300 that support an IP multimedia subsystem (IMS) type communication service, 3G system 400 that supports a circuit switching (CS) type communication service, IMS 500, and CS 600.

The 5G system 200, for example, is a mobile communication system according to New Radio (NR), and includes 5GRAN 210 and 5G core network 220 that is connected to the 5GRAN 210. The 5GRAN 210 is a network constituted by a radio base station (gNB) and the like, and for example, executes connection processing with the UE 100. The radio base station of the 5GRAN 210 controls the radio communication with the LIE 100 in 5G cell 230. Note that, even if only one radio base station is shown in FIG. 1, the 5GRAN 210 includes a plurality of the radio base stations and these radio base stations form a plural of the 5G cells.

The 5G core network 220 is a network constituted by a switching station and the like, and, for example, executes an attach processing with the UE 100. In addition to the 5GRAN 210, the 5G core network 220 is also connected to 4GRAN 310 explained later. Note that it can be assumed that the 5G core network 220 does not support the IMS-type communication service because of the architecture of the network.

The 4G system 300, for example, is a mobile communication system according to LTE specifications, and includes the 4GRAN (E-UTRAN) 310 and 4G core network (EPC) 320 that is connected to the 4GRAN 310. The 4GRAN 310 is a network constituted by a radio base station (eNodeB) and the like, and, for example, executes connection processing with the UE 100. The radio base station of the 4GRAN 310 controls the radio communication with the UE 100 in 4G cell 330. Note that, even if only one radio base station is shown in FIG. 1, the 4GRAN 310 includes a plurality of the radio base stations and these radio base stations form a plurality of the 4G cells. The 4G core network 320 is a network constituted by a switching station (MME) and the like, and, for example, executes the attach processing with the UE 100.

The 3G system 400 includes 3GRAN (UTRAN) 410 and 3G core network 420 that is connected to the 3GRAN 410. The 3GRAN 410 is a network constituted by a radio base station (NodeB), a radio network control device (RNC), and the like, and, for example, executes connection processing with the UE 100. The radio base station of the 3GRAN 410 controls the radio communication with the UE 100 in 3G cell 430. Note that, even if only one radio base station is shown in FIG. 1, the 3GRAN 410 includes a plurality of the radio base stations and these radio base stations form a plurality of the 3G cells. The 3G core network 420 is a network constituted by a switching station (MSC/VLR) and the like, and, for example, executes the attach processing with the UE 100.

The IMS 500 is connected to the 5G core network 220, and provides the IMS-type communication service to the UE 100 via the 5GRAN 210 and the 5G core network 220 or via the 4GRAN 310 and the 5G core network 220. Similarly, the IMS 500 is connected to the 4G core network 320, and provides the IMS-type communication service to the UE 100 via the 4GRAN 310 and the 4G core network 320. The CS 600 is connected to the 3G core network 420, and provides the CS-type communication service to the UE 100 via the 3GRAN 410 and the 3G core network 420.

(2) Functional Block Configuration of Radio Communication System

A functional block configuration of the radio communication system 10 is explained below. Specifically, a functional block configuration of the UE 100 is explained below. A hardware configuration of the UE 100 will be explained later.

Figure 2:
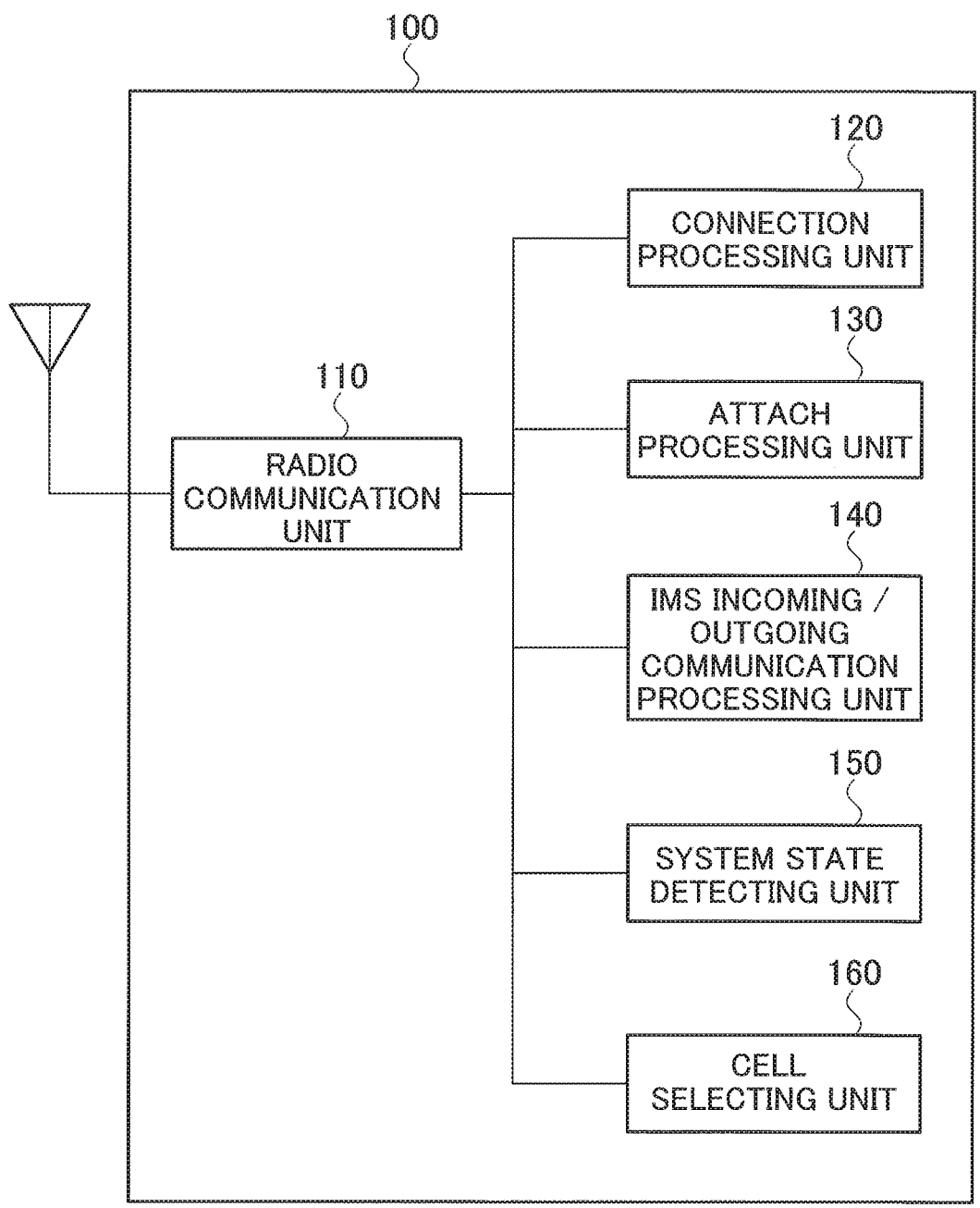
FIG. 2 is a functional block diagram of UE 100.

FIG. 2 is a functional block diagram of the UE 100. As shown in FIG. 2, the UE 100 includes a radio communication unit 110, a connection processing unit 120, an attach processing unit 130, IMS incoming/outgoing communication processing unit 140, a system state detecting unit 150, and a cell selecting unit 160.

The radio communication unit 110 transmits various signals based on requests received from the connection processing unit 120, the attach processing unit 130, and the IMS incoming/outgoing communication processing unit 140. The radio communication unit 110 receives various signals from the 5G system 200, the 4G system 300, or the 3G system 400, and transmits the received signals to the connection processing unit 120, the attach processing unit 130, the IMS incoming/outgoing communication processing unit 140, or the system state detecting unit 150.

The connection processing unit 120 requests the radio communication unit 110 to transmit the radio signal so as to transmit a connection request signal to RAN (for example, the 5GRAN 210 or the 4GRAN 310) of a target generation system when the UE 100 attempts to connect to the target generation system (for example, the 5G system 200 or the 4G system 300) to perform emergency call communication, voice communication, or video call communication via IP packet. In other words, the connection processing unit 120 transmits the connection request signal to the RAN of the target generation system via the radio communication unit 110. The radio communication unit 110 transmits, based on the received request, the radio signal to the RAN of the target generation system.

As it will be explained later, upon instructed by the cell selecting unit 160 to attempt to connect to the 4G cell 330 that is selected as the target cell for connection, the connection processing unit 120 requests the radio communication unit 110 to transmit the radio signal so as to only transmit the connection request signal for the IMS-type communication service to the target cell for connection. In other words, the connection processing unit 120 transmits the connection request signal for the IMS-type communication service to the target cell for connection via the radio communication unit 110. The radio communication unit 110 transmits, based on the received request, the radio signal to the 4GRAN 310. As an example of the connection request signal, RRC CONNECTION REQUEST can be cited.

Upon receiving a connection setup signal from the target generation system via the radio communication unit 110, the connection processing unit 120 establishes radio connection with the target generation system. On the other hand, upon receiving a connection rejection signal or a fallback instruction from the target generation system via the radio communication unit 110, the connection processing unit 120 does not establish the radio connection with the target generation system. As an example of the connection setup signal, RRC CONNECTION SETUP can be cited. As an example of the connection rejection signal, RRC CONNECTION REJECTION can be cited.

The attach processing unit 130 requests the radio communication unit 110 to transmit the radio signal so as to transmit an attach request signal to a core network (for example, the 5G core network 220 or the 4G core network 320) of the target generation system when the UE 100 attempts to attach to the target generation system after the radio connection has been established with the target generation system. In other words, the attach processing unit 130 transmits the attach request signal to the core network of the target generation system via the radio communication unit 110. The radio communication unit 110 transmits, based on the received request, the radio signal to the core network of the target generation system. Upon receiving an attach complete response signal from the target generation system via the radio communication unit 110, the attach processing unit 130 completes the attach processing with the target generation system. On the other hand, upon receiving a non-IMS support notification or the fallback instruction from the target generation system via the radio communication unit 110, the attach processing unit 130 stops executing the attach processing with the target generation system.

The IMS incoming/outgoing communication processing unit 140 requests the radio communication unit 110 to transmit the radio signal so as to transmit the IMS registration request signal to the IMS 500 that is connected to the target generation system, when the UE 100 attempts to execute the IMS registration procedure after the attach processing with the target generation system is completed and before performing the IMS incoming/outgoing communication. In other words, the IMS incoming/outgoing communication processing unit 140 transmits, via the radio communication unit 110, the IMS registration request signal to the IMS 500 that is connected to the target generation system. The radio communication unit 110 transmits, based on the received request, the radio signal to the IMS 500 that is connected to the target generation system. Upon receiving the IMS registration completion signal from the IMS 500 via the radio communication unit 110, the IMS incoming/outgoing communication processing unit 140 completes the IMS registration procedure. Subsequently, the IMS incoming/outgoing communication processing unit 140 requests the radio communication unit 110 to transmit the radio signal so as to transmit an INVITE signal to the IMS 500 that is connected to the target generation system, when the IMS incoming/outgoing communication is attempted. In other words, the IMS incoming/outgoing communication processing unit 140 transmits, via the radio communication unit 110, the INVITE signal to the IMS 500 that is connected to the target generation system. The radio communication unit 110 transmits, based on the received request, the radio signal to the IMS 500 that is connected to the target generation system, and performs the IMS incoming/outgoing communication via the target generation system.

However, in addition to the 4G core network 320, the 4GRAN 310 of the 4G system 300 is also connected to the 5G core network 220. Therefore, the IMS incoming/outgoing communication processing unit 140 can also execute the IMS registration procedure and IMS incoming/outgoing communication explained above with the IMS 500 via the 4GRAN 310 and the 5G core network 220.

Upon being notified from the connection processing unit 120 that the connection rejection signal from the 5G system 200 is received, based on the notification, the system state detecting unit 150 detects that access to the 5G system 200 is barred, and transmits a detection signal to the cell selecting unit 160. Upon being notified from the attach processing unit 130 that the non-IMS support notification is received from the 5G system 200, based on the notification, the system state detesting unit 150 detects that the 5G core network 220 of the 5G system 200 does not support the IMS-type communication service and transmits the detection signal to the cell selecting unit 160. Upon being notified from the connection processing unit 120 or the attach processing unit 130 that the fallback instruction is received from the 5G system 200, based on the received notification, the system state detecting unit 150 detects the instruction to perform fallback to the 4G system 300 and transmits the detection signal to the cell selecting unit 160. Upon being notified from the connection processing unit 120 or the attach processing unit 130 that the response signal is not received from the 5G system 200 even after a predetermined time has elapsed, based on the notification, the system state detecting unit 150 detects that the 5G system 200 is congested and transmits the detection signal to the cell selecting unit 160.

The system state detecting unit 150 receives broadcast information from the 5G system 200 via the radio communication unit 110. Upon detecting that the received broadcast information includes access restriction information, congestion information, non-IMS support information, or fallback instruction information, the system state detecting unit 150 transmits the detection signal to the cell selecting unit 160. As an example of the broadcast information, System Information Block (SIB) can be cited.

The system state detecting unit 150 receives a paging signal from the 5G system 200 via the radio communication unit 110. Upon detecting that the received paging signal includes the access restriction information, the congestion information, the non-IMS support information, or the fallback instruction information, the system state detecting unit 150 transmits the detection signal to the cell selecting unit 160.

The access restriction information is the information, via which it is notified that the access to the 5G system 200 is barred. By using the access restriction information, the 5G system 200 notifies the UE 100 that emergency call communication, voice communication, or video call communication via IP packet is restricted in the entire 5G system 200 or a specific 5G cell. As an example of the access restriction information, Access Class Barring (ACB), Service Specific Access Control (SSAC) Barring, Access Control for general Data Connectivity (ACDC), and User Access Control (UAC) can be cited.

The congestion information is the information via which it is notified that the 5G system 200 is congested. By using the congestion information, the 5G system 200 notifies the UE 100 that congestion has occurred in the 5GRAN 210, in the 5G core network 220, or between the 5GRAN 210 and the 5G core network 220.

The non-IMS support information is the information via which it is notified that the 5G core network 220 of the 5G system 200 does not support the IMS-type communication service. By using the non-IMS support information, the 5G system 200 notifies the UE 100 that the 5G core network 220 does not support the IMS-type communication service.

The fallback instruction information is the information via which fallback to the 4G system 300 is instructed. By using the fallback instruction information, the 5G system 200 instructs the UE 100 to perform fallback to the 4G system 300.

When the received broadcast information or the paging signal includes frequency information having information on a plurality of the frequencies used by the plurality of the 4G cells in the 4G system 300 that supports the IMS-type communication service, the system state detecting unit 150 notifies the cell selecting unit 160 of the frequency information. When the received broadcast information or the paging signal includes cell information having information on the plurality of the 4G cells that are formed near the 5G cell 230 of the 5G system 200 in which the UE 100 resides, in the 4G system 300 that supports the IMS-type communication service, the system state detecting unit 150 notifies the cell selecting unit 160 of the cell information.

Upon receiving the detection signal from the system state detecting unit 150, the cell selecting unit 160 selects, as the target cell for connection, the 4G cell 330 of the 4G system 300 that supports the IMS-type communication service. Specifically, the cell selecting unit 160 selects, the target cell for connection, the 4G cell 330 in the 4G system 300 that uses a different frequency than that used by the 5G cell 230 of the 5G system 200 in which the UE 100 resides. Upon receiving the detection signal from the system state detecting unit 150 when the frequency information is notified from the system state detecting unit 150, the cell selecting unit 160 selects, as the target cell for connection, the 4G cell 330 that uses a different frequency than that used by the 5G cell 230, based on the frequencies included in the frequency information. Upon selecting the 4G cell 330 as the target cell for connection, the cell selecting unit 160 instructs the connection processing unit 120 to attempt to connect to the 4G system 300.

Alternatively, upon receiving the detection signal from the system state detecting unit 150, in the 4G system 300, the cell selecting unit 160 can select, as the target cell for connection, the 4G cell 330 formed near the 5G cell 230 of the 5G system 200 in which the UE 100 resides. In such a case, a part or an entire area of the 4G cell 330 of the 4G system 300 that is formed near the 5G cell 230 of the 5G system 200 can overlap with that of the 5G cell 230. Upon receiving a detection signal from the system state detecting unit 150 when the cell information is notified from the system state detecting unit 150, the cell selecting unit 160 selects the target cell for connection from among the plurality of the 4G cells of the 4G system 300 included in the cell information.

(3) Operation of Radio Communication System

Operation of the radio communication system 10 is explained below. Specifically, operations related to the processing performed by the UE 100 to fall back from the 5G system 200 to the 4G system 300 will be explained.

(3.1) Fallback Processing

Figure 3:
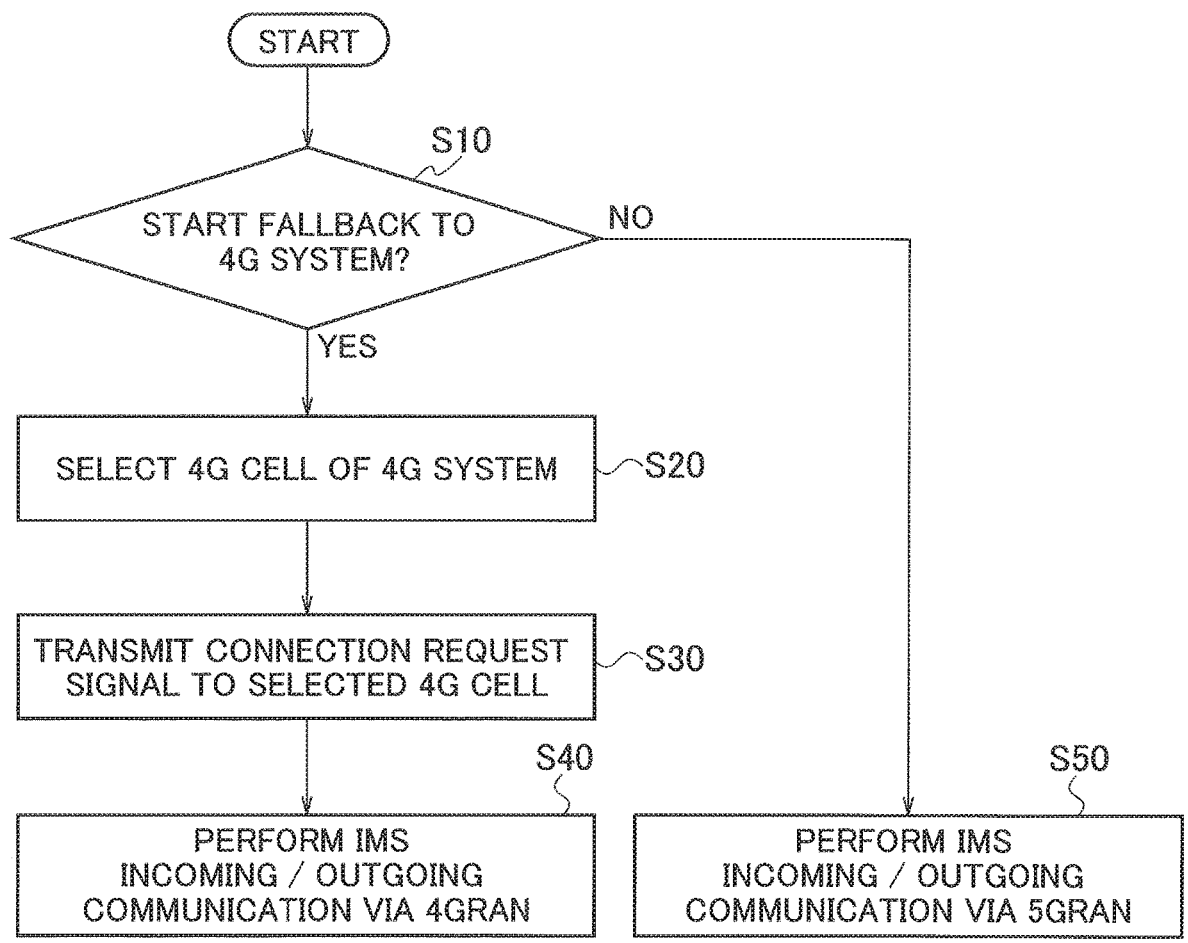
FIG. 3 is a diagram showing a flow of fallback processing performed by the UE 100.

FIG. 3 shows a processing flow of fallback performed by the UE 100. As shown in FIG. 3, the UE 100 determines whether fallback from the 5G system 200 to the 4G system 300 is to be started (Step S10). Specifically, in the 5G cell 230 of the 5G system 200, the UE 100 determines whether the access restriction to the 5G system 200, congestion of the 5G system 200, non-support for the IMS by the 5G core network 220, or fallback instruction is detected.

More specifically, upon detecting that at least one of the following conditions is fulfilled, the UE 100 determines to perform fallback to the 4G system 300: (1) the system state detecting unit 150 is notified from the connection processing unit 120 that the connection rejection signal is received from the 5G system 200; (2) the system state detecting unit 150 is notified from the attach processing unit 130 that the non-IMS support notification is received from the 5G system 200; (3) the system state detecting unit 150 is notified from the connection processing unit 120 or the attach processing unit 130 that the response signal is not received from the 5G system even after the predetermined time has elapsed; (4) the system state detecting unit 150 is notified from the connection processing unit 120 or the attach processing unit 130 that the fallback instruction is received from the 5G system 200; and (5) the system state detecting unit 150 detects that the broadcast information or the paging signal received from the 5G system 200 via the radio communication unit 110 includes the access restriction information, the congestion information, the non-IMS support information, or the fallback instruction information.

Upon determining that fallback to the 4G system 300 is to be started, the UE 100 selects the 4G cell 330 of the 4G system 300 as the target cell for connection (Step S20).

Specifically, upon receiving from the system state detecting unit 150 the detection signal that indicates that at least one of the conditions explained above is fulfilled, the cell selecting unit 160 selects, as the target cell for connection, the 4G cell 330 of the 4G system 300 that uses a different frequency than that used by the 5G cell 230 of the 5G system 200 in which the UE 100 resides. When the frequency information included in the broadcast information or the paging signal received from the 5G system 200 is notified from the system state detecting unit 150, the cell selecting unit 160 selects, as the target cell for connection, the 4G cell 330 that uses a different frequency than that used by the 5G cell 230, based on the frequencies included in the frequency information.

However, even if the 3G system 400 that supports the CS-type communication service is available for fallback, the UE 100 avoids selecting the 3G cell 430 of the 3G system 400 as the target cell for connection. Specifically, when the system state detecting unit 150 receives via the radio communication unit 110 the information that indicates whether fallback from the 5G system 200 to the 4G system 300 that supports the IMS-type communication service or the 3G system 400 that supports the CS-type communication services is allowed, the UE 100 can avoid selecting the 3G cell 430 of the 3G system 400 as the get cell for connection.

The UE 100 transmits the connection request signal to the 4G cell 330 that is selected as the target cell for connection (Step S30). Specifically, the connection processing unit 120 requests the radio communication unit 110 to transmit the radio signal so as to transmit the connection request signal to the 4G system 330. The radio communication unit 110 transmits, based on the received request, the radio signal to the 4GRAN 310 of the 4G system 300.

Upon connecting to the 4G system 300, the UE 100 executes IMS incoming/outgoing communication with the IMS 500 via the 4GRAN 310 and the 4G core network 320 (Step S40). Specifically, upon receiving the connection setup signal from the 4GRAN 310 via the radio communication unit 110, the connection processing unit 120 establishes the radio connection with the 4G system 300. The attach processing unit 130 requests the radio communication unit 110 to transmit the radio signal so as to transmit the attach request signal after the UE 100 has established the radio connection with the 4G system 300. The radio communication unit 110 transmits, based on the received request, the radio signal to the 4G core network 320 of the 4G system 300. Upon receiving the attach complete response signal from the 4G core network 320 via the radio communication unit 110, the attach processing unit 130 completes the attach processing with the 4G system 300. The IMS incoming/outgoing communication processing unit 140 execute an IMS registration procedure with the IMS 500 via the 4GRAN 310 and the 4G core network 320 after the UE 100 has completed the attach processing with the 4G system 300, and requests the radio communication unit 110 to transmit the radio signal so as to transmit the INVITE signal. The radio communication unit 110 transmits, based on the received request, the radio signal to the IMS 500 and performs the IMS incoming/outgoing communication with the IMS 500 via the 4GRAN 310 and the 4G core network 320.

In addition, when the 5G core network 220 supports the IMS-type communication service, the UE 100 can execute the IMS incoming/outgoing communication with the IMS 500 via the 4GRAN 310 and the 5G core network 220. Moreover, when the UE 100 is unable to connect to the 4G system 300, the UE 100 avoids selecting the 30 cell 430 of the 3G system 400 as the target cell for connection even when the 3G system 400 that supports the CS-type communication service is available for fallback. Specifically, when the system state detecting unit 150 receives via the radio communication unit 110 the information that indicates whether fallback from the 5G system 200 or the 4G system 300 to the 3G system 400 that supports the CS-type communication service is allowed, the UE 100 can avoid selecting the 3G cell 430 of the 3G system 400 as the target cell for connection.

On the other hand, upon determining that fallback to the 4G system 300 is not to be started, the UE 100 performs the IMS incoming/outgoing communication with the IMS 500 via the 5GRAN 210 and the 5G core network 220 (Step S50).

(3.1.1) Operation Example 1

Figure 4:
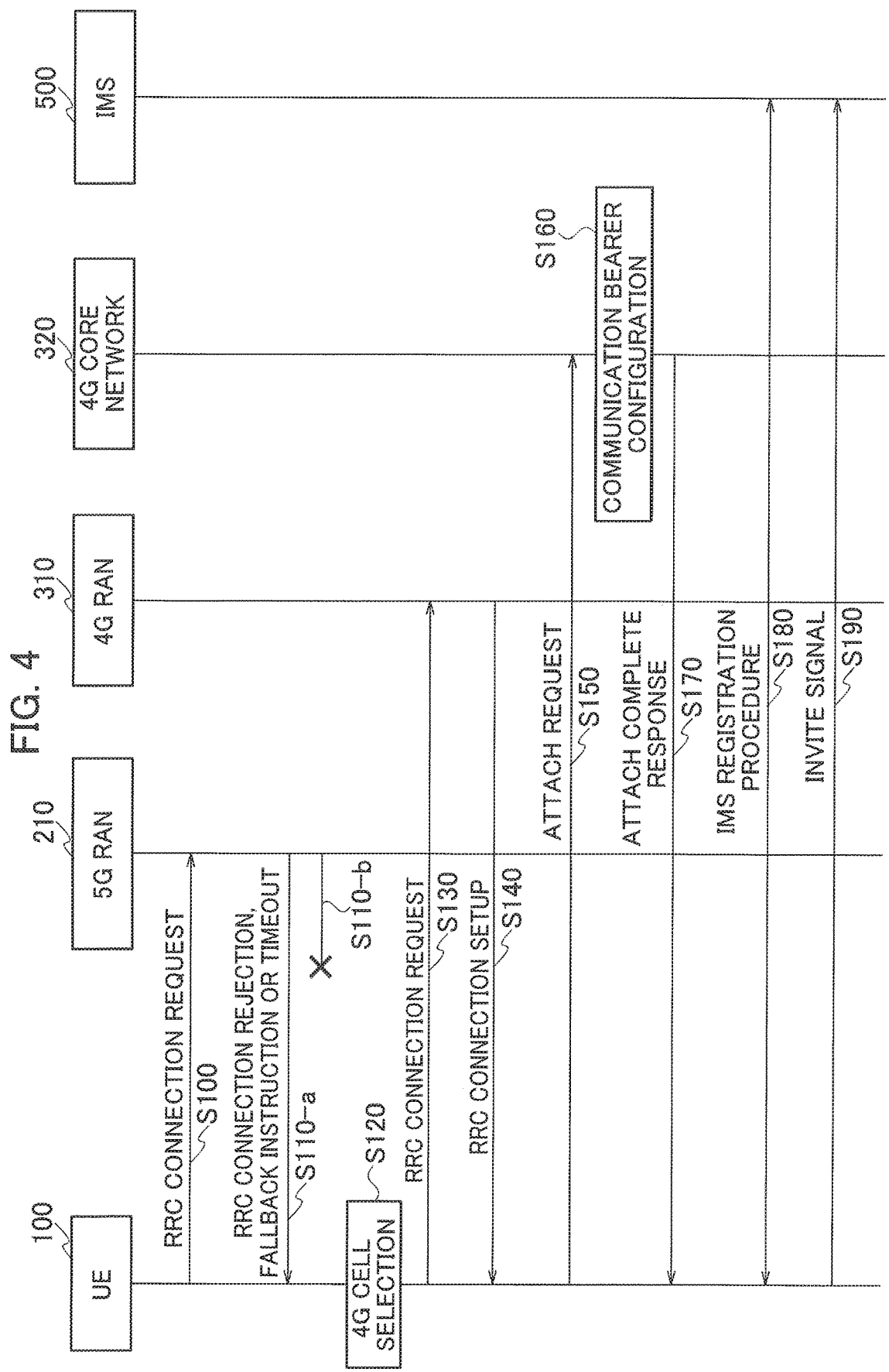
FIG. 4 is a diagram showing a processing sequence of fallback from 5G system 200 to 4G system 300 (Operation Example 1).

FIG. 4 shows a processing sequence of fallback from the 5G system 200 to the 4G system 300 according to Operation Example 1. In the present operation example, when the UE 100 receives RRC CONNECTION REJECTION or the fallback instruction from the 5GRAN 210, or does not receive the response signal from the 5GRAN 210 even after the predetermined time has elapsed, the UE 100 performs fallback to the 4G system 300.

When a connection request for performing emergency call communication, voice communication, or video call communication via IP packet occurs in the application layer of the UE 100 in a state in which the UE 100 has not established the radio connection with the 5G system 200 (for example, IDLE state or RRC Inactivity state), the UE 100 attempts to connect to the 5G system 200. Specifically, in the 5G cell 230 of the 5G system 200, the UE 100 transmits RRC CONNECTION REQUEST to the 5GRAN 210 (Step S100). When emergency call communication, voice communication, or video call communication via IP packet is restricted in the entire 5G system 200 or the 5G cell 230, the UE 100 receives RRC CONNECTION REJECTION from the 5GRAN 210 (Step S110-*a*). Moreover, when the 5G system 200 instructs the UE 100 to perform fallback to the 4G system 300, the UE 100 receives the fallback instruction from the 5GRAN 210 (Step S110-*a*) Alternatively, when congestion has occurred in, the 5GRAN 210, the UE 100 does not receive the response signal from the 5GRAN 210 even after the predetermined timed has elapsed (Step S110-*b*)

When the UE 100 receives RRC CONNECTION REJECTION or the fallback instruction from the 5GRAN 210 or does not receive the response signal from the 5GRAN 210 even after the predetermined time has elapsed, the UE 100 starts to perform fallback to the 4G system 300. Specifically, the UE 100 selects, as the target cell for connection, the 4G cell 330 of the 4G system 300 that uses a different frequency than that used by the 5G cell 230 (Step S120). In the 4G cell 330 that is selected as the target cell for connection, the UE 100 transmits RRC CONNECTION REQUEST to the 4GRAN 310 (Step S130). Upon receiving RRC CONNECTION SETUP from the 4GRAN 310 (Step S140), the UE 100 establishes the radio connection with the 4G system 300. Subsequently, the UE 100 transmits the attach request signal to the 4G core network 320 (Step S150), and after a communication bearer is configured in the 4G core network 320 (Step S160), the UE 100 receives the attach complete response signal from the 4G core network 320 (Step S170). Once the attach processing with the 4G core network 320 is completed, the UE 100 executes the IMS registration procedure with the IMS 500 via the 4GRAN 310 and the 4G core network 320 (Step S180). Subsequently, the UE 100 transmits the INVITE signal to the IMS 500 via the 4GRAN 310 and the 4G core network 320 (Step S190), and performs the IMS incoming/outgoing communication.

(3.1.2) Operation Example 2

Figure 5:
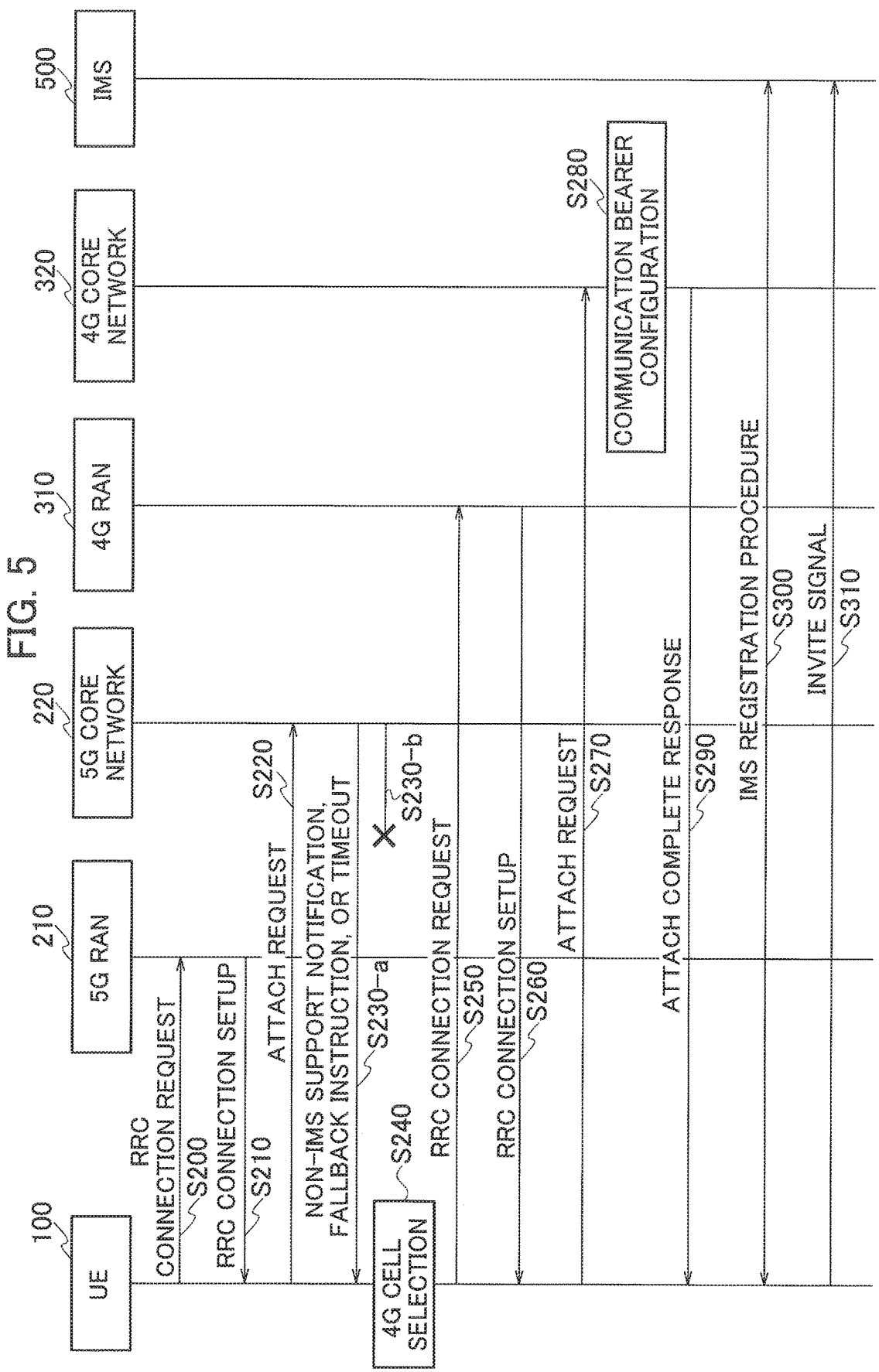
FIG. 5 is a diagram showing a processing sequence of fallback from the 5G system 200 to the 4G system 300 (Operation Example 2).

FIG. 5 shows a processing sequence of fallback from the 5G system 200 to the 4G system 300 according to Operation Example 2. In the present operation example, when the UE 100 receives the non-IMS support notification or the fallback instruction from the 5G core network 220, or does not receive the response signal from the 5G core network 220 even after the predetermined time has elapsed, the UE 100 performs fallback to the 4G system 300.

When the connection request for performing emergency call communication, voice communication, or video call communication via IP packet occurs in the application layer of the UE 100 in the state in which the UE 100 has not established the radio connection with the 5G system 200 (for example, IDLE state or RRC Inactivity state), the UE 100 attempts to connect to the 5G system 200. Specifically, in the 5G cell 230 of the 5G system 200, the UE 100 transmits RRC CONNECTION REQUEST to the 5GRAN 210 (Step S200). Upon receiving RRC CONNECTION SETUP from the 5GRAN 210 (Step S210), the UE 100 establishes the radio connection with the 5G system 200. Subsequently, the UE 100 transmits the attach request signal to the 5G core network 220 (Step S220). When the 5G core network 220 does not support the IMS-type communication service, the UE 100 receives the non-IMS support notification from the SG core network 220 (Step S230-*a*). Moreover, when the 5G system 200 instructs the UE 100 to perform fallback to the 4G system 300, the UE 100 receives the fallback instruction from the 5G core network 220 (Step S230-*a*). Alternatively, when congestion has occurred in the 5G core network 220, the UE 100 does not receive the response signal from the 5G core network 220 even after the predetermined timed has elapsed (Step S230-*b*)

In a response to a location registration request in a location registration procedure with a network that is performed based on the reception of the attach request signal, if the network notifies that the 5G core network 220 does not support the IMS-type communication service, the 5G core network 220 can transmit the non-IMS support notification to the UE 100.

When the UE 100 receives the non-IMS support notification or the fallback instruction from the 5G core network 220 or does not receive the response signal from the 5G core network 220 even after the predetermined time has elapsed, the UE 100 starts to perform fallback to the 4G system 300. Specifically, the UE 100 selects, as the target cell for connection, the 4G cell 330 of the 4G system 300 that uses a different frequency than that used by the 5G cell 230 (Step S240).

In the present operation example, because the processing performed at Steps S250 to S310 is the same as that performed at Steps S130 to S190 of Operation Example 1, explanation thereof is omitted.

(3.1.3) Operation Example 3

Figure 6:
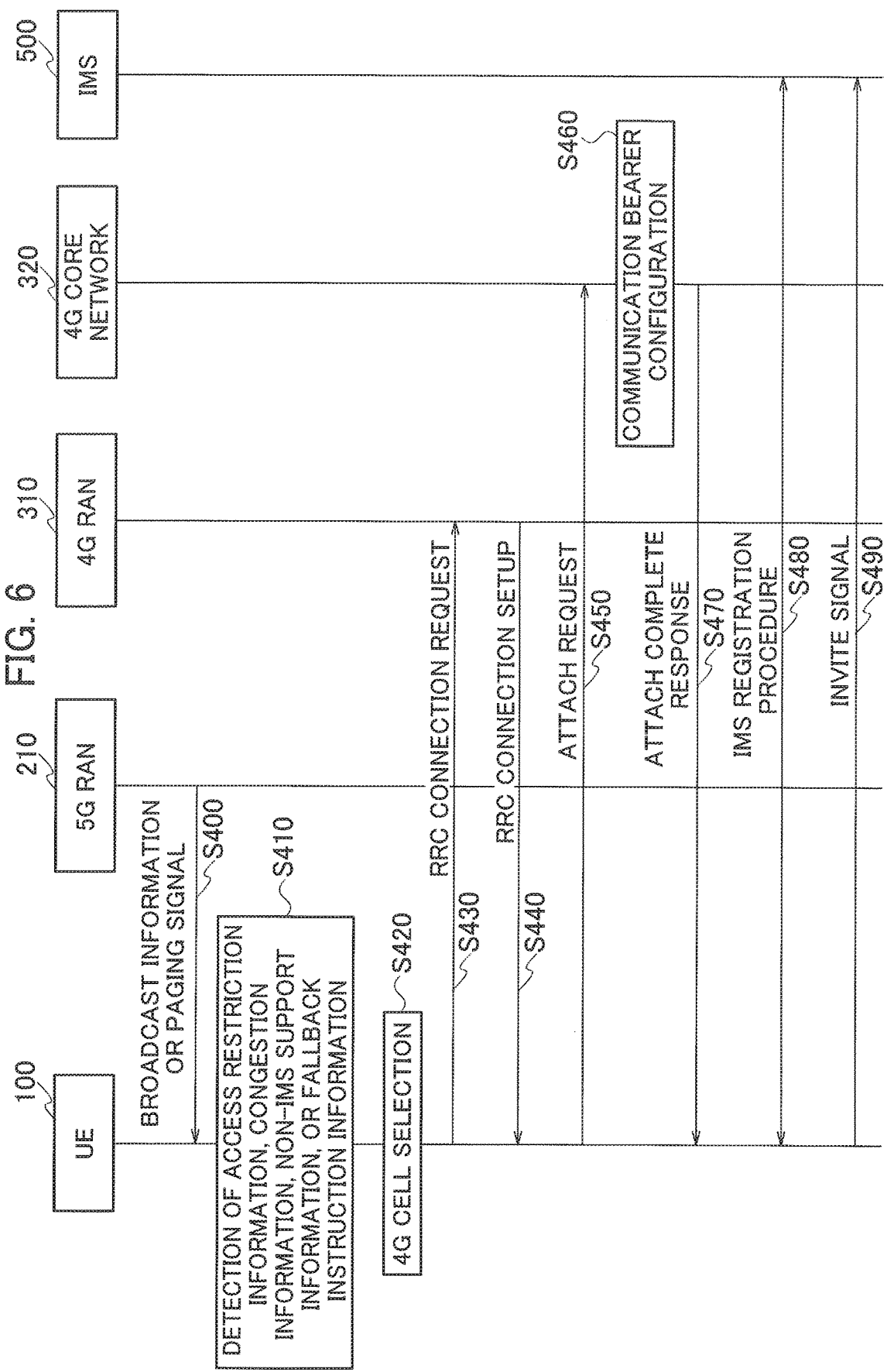
FIG. 6 is a diagram showing a processing sequence of fallback from the 5G system 200 to the 4G system 300 (Operation Example 3).

FIG. 6 shows a processing sequence of fallback from the 5G system 200 to the 4G system 300 according to Operation Example 3. In the present operation example, the UE 100 receives the broadcast information or the paging signal from the 5GRAN 210, and performs fallback to the 4G system 300 when the access restriction information, the congestion information, the non-IMS support information, or the fallback instruction information is included in the received broadcast information or the paging signal.

Before and after the timing at which the connection request for performing emergency call communication, voice communication, or video call communication via IP packet occurs in the application layer of the UE 100 in a state in which the UE 100 has not established the radio connection with the 5G system 200 (for example, the IDLE state or the RRC Inactivity state), the UE 100 receives the broadcast information or the paging signal from the 5G system 200. Specifically, in the 5G cell 230 of the 5G system 200, the UE 100 receives the broadcast information or the paging signal from the 5GRAN 210 (Step S400).

When emergency call communication, voice communication, or video call communication via IP packet is restricted in the entire 5G system 200 or the 5G cell 230, the 5GRAN 210 includes the access restriction information in the broadcast information or the paging signal. When the congestion has occurred in the 5GRAN 210, in the 5G core network 220, or between the 5GRAN 210 and 5G core network 220, the 5GRAN 210 includes the congestion information in the broadcast information or the paging signal. When the 5G core network 220 does not support the IMS-type communication service, the 5GRAN 210 includes the non-IMS support information in the broadcast information or the paging signal. When the 5G system 200 instructs the UE 100 to perform fallback to the 4G system 300, the 5GRAN 210 includes the fallback instruction information in the broadcast information or the paging signal.

Upon detecting that the access restriction information, the congestion information, the non-IMS support information, or the fallback instruction information is included in the received broadcast information or the paging signal (Step S410), the UE 100 starts performing fallback to the 4G system 300. Specifically, the UE 100 selects, as the target cell for connection, the 4G cell 330 of the 4G system 300 that uses a different frequency than that used by the 5G cell 230 (Step S420). When the frequency information is included in the received broadcast information or the paging signal, the UE 100 selects, as the target cell for connection, the 4G cell 330 that uses a different frequency than that used by the 5G cell 230, based on the frequencies included in the frequency information.

In the present operation example, because the processes performed at Steps S430 to S490 are the same as that performed at Steps S130 to S190 of Operation Example 1, the explanation thereof is omitted.

(3.1.4) Operation Example 4

Figure 7:
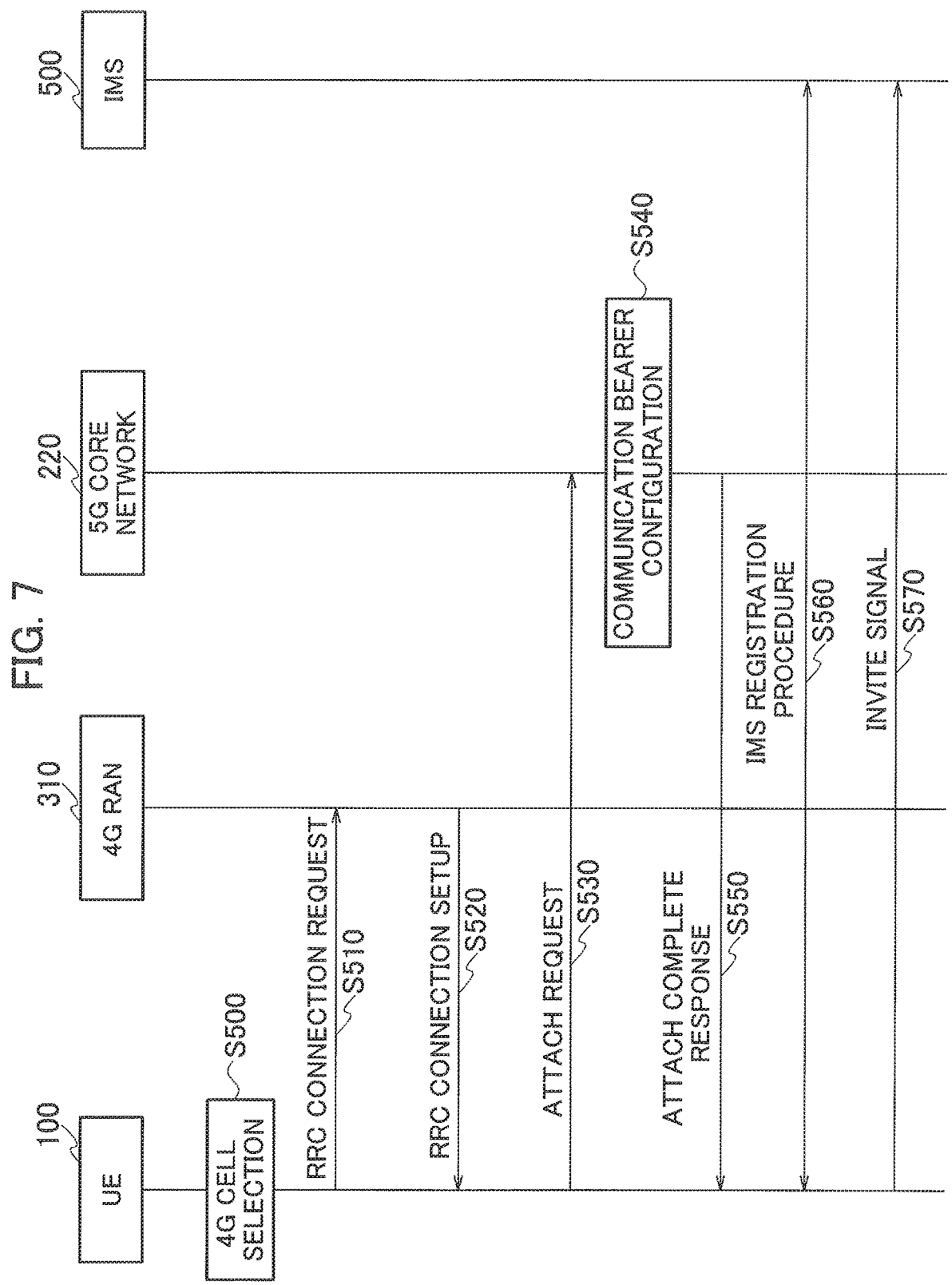
FIG. 7 is a diagram showing a processing sequence of fallback from the 5G system 200 to the 4G system 300 (Operation Example 4).

FIG. 7 shows a processing sequence of fallback from the 5G system 200 to the 4G system 300 according to Operation Example 4. In the present operation example, when the 5G core network 220 supports the IMS-type communication service, the UE 100 executes the IMS registration procedure and the IMS incoming/outgoing communication with the IMS 500 via the 4GRAN 310 and the 5G core network 220.

Because the processes performed at Steps S500 to S520 shown in FIG. 7 are the same as those performed at Steps S120 to S140 shown in FIG. 4, those performed at Steps S240 to S260 shown in FIG. 5, and those performed at Steps S420 to S440 shown in FIG. 6, the explanation thereof is omitted. Upon establishing the radio connection with the 4G system 300, the UE 100 transmits the attach request signal to the 5G core network 220 (Step S530), and after the communication bearer is configured in the 5G core network 220 (Step S540), the UE 100 receives the attach complete response signal from the 5G core network 220 (Step S550). Once the attach processing with the 5G core network 220 is completed, the UE 100 executes the IMS registration procedure with the IMS 500 via the 4GRAN 310 and the 5G core network 220 (Step S560). Subsequently, the UE 100 transmits the INVITE signal to the IMS SOO via the 4GRAN 310 and the 5G core network 220 (Step S570), and performs the IMS incoming/outgoing communication.

(3.2) Modifications of Fallback Processing

Figure 8:
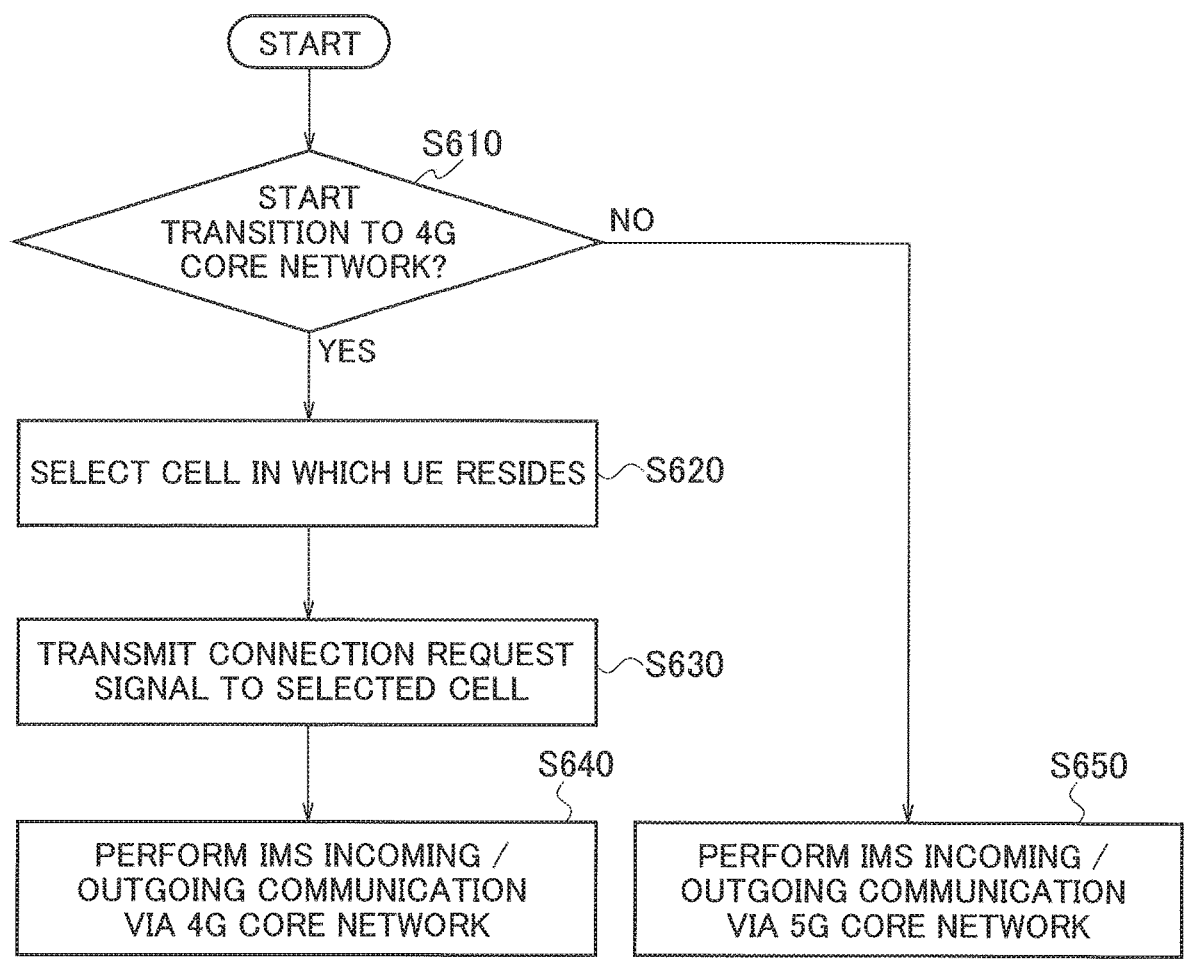
FIG. 8 is a diagram showing a modification example of the flow of fallback processing performed by the UE 100.

FIG. 8 shows a modification of the flow of fallback processing performed by the UE 100. Specifically, FIG. 8 shows a transition of a core network performed by the UE 100 in a configuration in which the 4GRAN 310 is connected to the 4G core network 320 and the 5G core network 220. As shown in FIG. 8, the UE 100 determines whether the transition from the 5G core network 220 to the 4G core network 320 is to be started (Step S610). Specifically, the system state detecting unit 150 of the UE 100 determines whether the congestion in the 5G core network 220 or the non-support for IMS in the 5G core network 220 is detected in the 4G cell 330. In addition, when the system state detecting unit 150 detects that the congestion information or the non-IMS support information is included in the broadcast information or the paging signal received from the 4GRAN 310 via the radio communication unit 110 in the 4G cell 330, the UE 100 can determine that the transition from the 5G core network 220 to the 4G core network 320 is to be started.

Upon determining that the transition to the 4G core network 320 is to be started, the UE 100 selects, as the target cell for connection, the 4G cell 330 in which the UE 100 resides (Step S620). Specifically, upon receiving from the system state detecting unit 150 the detection signal that indicates that the 5G core network 220 is congested or the 5G core network 220 does not support IMS, the cell selecting unit 160 selects, as the target cell for connection, the 4G cell 330 in which the UE 100 resides.

The UE 100 transmits the connection request signal to the 4G cell 330 that is selected as the target cell for connection (Step S630). Specifically, the connection processing unit 120 requests the radio communication unit 110 to transmit the radio signal, so a to transmit the connection request signal to the 4G cell 330. The radio communication unit 110 transmits, based on the received request, the radio signal to the 4GRAN 310.

Upon connecting to the 4GRAN 310, the UE 100 performs the IMS incoming/outgoing communication with the IMS 500 via the 4GRAN 310 and the 4G core network 320 (Step S640). Specifically, upon receiving the connection setup signal from be 4GRAN 310 via the radio communication unit 110, the connection processing unit 120 establishes the radio connection with the 4GRAN 310. The attach processing unit 130 request the radio communication unit 110 to transmit the radio signal so as to transmit the attach request signal after the UE 100 has established the radio connection with the 4GRAN 310. The radio communication unit 110 transmits, based on the received request, the radio signal to the 4G core network 4G. Upon receiving the attach complete response signal from the 4G core network 320 via the radio communication unit 110, the attach processing unit 130 completes the attach processing with the 4G core network 320. After the UE 100 has completed the attach processing with the 4G core network 320, the IMS incoming/outgoing communication processing unit 140 executes the IMS registration procedure with the IMS 500 via the 4GRAN 310 and the 4G core network 320, and requests the radio communication unit 110 to transmit the radio signal so as to transmit the INVITE signal. The radio communication unit 110 transmits, based on the received request, the radio signal to the IMS 500 and performs the IMS incoming/outgoing communication with the IMS 500 via the 4GRAN 310 and the 4G core network 320.

On the other hand, upon determining that the transition to the 4G core network 320 is not to be started, the UE 100 performs the IMS incoming/outgoing communication with the IMS 500 via the 4GRAN 310 and the 5G core network 220 (Step S650).

(4) Effects and Advantages

According to the embodiments explained above, upon transmitting the connection request signal to the 5GRAN 210 in the 5G cell 230 of the 5GRAN 210 and receiving a connection rejection signal from the 5GRAN 210, the UE 100 selects the 4G cell 330 of the 4G system 300 as the target cell for connection and starts the processing for fallback to the 4G system 300. In this manner, when the connection to the 5G system 200 is rejected, instead of performing fallback to the 3G system 400, the UE 100 autonomously selects the 4G cell 330 of the 4G system 300 that supports the IMS-type communication service and performs fallback to the 4G system 300. Therefore, because, in the embodiments explained above, even when the connection to the 5G system 200 is rejected, it is not necessary to perform fallback to the 4G system 300 at the initiative of the 5G system 200 and change communication service from the IMS-type service to CS-type service, time required to perform fallback can be shortened. As a result, service quality of communication that requires real time performance such as emergency calls, voice communication, and video calling can be maintained.

Upon transmitting the connection request signal to the 5GRAN 210 in the 5G cell 230 of the 5GRAN 210 and receiving the fallback instruction from the 5GRAN 210, the UE 100 selects the 4G cell 330 of the 4G system 300 as the target cell for connection and starts the processing for fallback to the 4G system 300. In this manner, when fallback to the 4G system 300 is instructed, instead of performing fallback, to the 3G system 400, the UE 100 autonomously selects the 4G cell 330 of the 4G system 300 that supports the IMS-type communication service and performs fallback to the 4G system 300. Therefore, because, in the embodiments explained above, when fallback to the 4G system 300 is instructed, it is not necessary to perform fallback to the 4G system 300 at the initiative of the 5G system 200 and change communication service from the IMS-type service to CS-type service, time required to perform fallback can be shortened. As a result, service quality of communication that requires real time performance such as emergency calls, voice communication, and video calling can be maintained.

Upon transmitting the connection request signal to the 5GRAN 210 in the 5G cell 230 of the 5GRAN 210 and not receiving a response signal from the 5GRAN 210 after the predetermined time has elapsed, the UE 100 selects the 4G cell 330 of the 4G system 300 as the target cell for connection and starts the processing for fallback to the 4G system 300. In this manner, when the 5G system 200 is congested, instead of performing fallback to the 3G system 400, the UE 100 autonomously selects the 4G cell 330 of the 4G system 300 that supports the IMS-type communication service and performs fallback to the 4G system 300. Therefore, because, in the embodiments explained above, even when the 5G system 200 is congested, it is not necessary to perform fallback to the 4G system 300 at the initiative of the 5G system 200 and change communication service from the IMS-type service to CS-type service, time required to perform fallback can be shortened. As a result, service quality of communication that requires real time performance such as emergency calls, voice communication, and video calling can be maintained.

Upon transmitting the attach request signal to the 5G core network 220 in the 5G cell 230 of the 5GRAN 210 and receiving the non-IMS support notification from the 5G core network 220, the UE 100 selects the 4G cell 330 of the 4G system 300 as the target cell for connection and starts the processing for fallback to the 4G system 300. In this manner, when the 5G core network 220 does not support the IMS-type communication service, instead of performing fallback to the 3G system 400, the UE 100 autonomously selects the 4G cell 330 of the 4G system 300 that supports the IMS-type communication service and performs fallback to the 4G system 300. Therefore, because, in the embodiments explained above, even when the 5G core network 220 does not support the IMS-type communication service, it is not necessary to perform fallback to the 4G system 300 at the initiative of the 5G system 200 and change communication service from the IMS-type service to CS-type service, time required to perform fallback can be shortened. As a result, service quality of communication that requires real time performance such as emergency calls, voice communication, and video calling can be maintained.

Upon transmitting the attach request signal to the 5G core network 220 in the 5G cell 230 of the SGRAN 210 and receiving the fallback instruction from the 5G tore network 220, the UE 100 selects the 4G cell 330 of the 4G system 300 as the target cell for connection and starts the processing for fallback to the 4G system 300. In this manner, when fallback to the 4G system 300 is instructed, instead of performing fallback to the 3G system 400, the UE 100 autonomously selects the 4G cell 330 of the 4G system 300 that supports the IMS-type communication service and performs fallback to the 4G system 300. Therefore, because, in the embodiments explained above, when fallback to the 4G system 300 is instructed, it is not necessary to perform fallback to the 4G system 300 at the initiative of the 5G system 200 and change communication service from the IMS-type service to CS-type service, time required to perform fallback can be shortened. As a result, service quality of communication that requires real time performance such as emergency calls, voice communication, and video calling can be maintained.

Upon transmitting the attach request signal to the 5G core network 220 in the 5G cell 230 of the 5GRAN 210 and not receiving the response signal from the 5G core network 220 even after the predetermined time has elapsed, the UE 100 selects the 4G cell 330 of the 4G system 300 as the target cell for connection and starts the processing for fallback to the 4G system 300. In this manner, when the 5G system 200 is congested, instead of performing fallback to the 3G system 400, the UE 100 autonomously selects the 4G cell 330 of the 4G system 300 that supports the IMS-type communication service and performs fallback to the 4G system 300. Therefore, because, in the embodiments explained above, even when the 5G system 200 is congested, it is not necessary to perform fallback to the 4G system 300 at the initiative of the 5G system 200 and change communication service from the IMS-type service to CS-type service, time required to perform fallback can be shortened. As a result, service quality of communication that requires real time performance such as emergency calls, voice communication, and video calling can be maintained.

Upon receiving broadcast information or the paging signal that, includes the access restriction information, the congestion information, the non-IMS support information, or the fallback instruction in the 5G cell 230 of the 5GRAN 210, the UE 100 selects the 4G cell 330 of the 4G system 300 as the target cell for connection and starts the processing for fallback to the 4G system 300. In this manner, when the access to the 5G system 200 is barred, the 5G system 200 is congested, the 5G core network 220 does not support the IMS-type communication service, or fallback to the 4G system 300 is instructed, instead of performing fallback to the 3G system 400, the UE 100 does not attempt to connect to the 5G system 200, and autonomously selects the 4G cell 330 of the 4G system 300 that supports the IMS-type communication service and performs fallback to the 4G system 300. Therefore, because, in the embodiments explained above, even when the access to the 5G system 200 is barred, the 5G system 200 is congested, the 5G core network 220 does not support the IMS-type communication service, or when fallback to the 4G system 300 is instructed, it is not necessary to perform fallback to the 4G system 300 at the initiative of the 5G system 200 and change communication service from the IMS-type service to CS-type service change communication service from the IMS-type service to CS-type service, time required to perform fallback can be shortened. As a result, service quality of communication that requires real time performance such as emergency calls, voice communication, and video calling can be maintained.

Moreover, when the broadcast information or the paging signal received in the 5G cell 230 of the 5GRAN 210 includes the frequency information, the DE 100 selects, based on the frequencies included in the frequency information, the 4G cell 330 that uses a different frequency than that used by the 5G cell 230 as the target cell for connection. Therefore, time required for selecting the target cell for connection can be shortened, and as a result, time required for performing fallback can be further shortened.

In a configuration in which the 4GRAN 310 is connected to the 4G core network 320 and the 5G core network 220, upon detecting in the 4G cell 330 that the 5G core network 220 is congested or the 5G core network 220 does not support the IMS, the UE 100 selects, as the target cell for connection, the 4G cell 330 in which the UE 100 resides, and starts the transition from the 5G core network 220 to the 4G core network 320. In this manner, when the 5G core network 220 is congested or the 5G core network 220 does not support the IMS-type communication service, instead of performing fallback to the 3G system 400, the UE 100 autonomously selects the 4G cell 330 of the 4G system 300 that supports the IMS-type communication service and performs fallback to the 4G system 300 to perform incoming/outgoing communication of the IMS-type communication service via the 4GRAN 310 and the 4G core network 320 that is connected to the 4GRAN 310. Therefore, because, in the embodiments explained above, even when the 5G core network 220 is congested or the SG core network 220 does not support the IMS-type communication service, it is not necessary to perform fallback to the 4G system 300 at the initiative of the 5G system 200 and change communication service from the IMS-type service to the CS-type service, time required to perform fallback can be shortened. As a result, service quality of communication that requires real time performance such as emergency calls, voice communication, and video calling can be maintained.

(5) Other Embodiments

The present invention has been explained in detail by using the above mentioned embodiments; however, it is self-evident to a person skilled in the art that the present invention is not limited to the embodiments explained herein and that the embodiments can be modified or improved in various ways.

For example, even if fallback to the 4G system 300 is explained in Operation Examples 1 to 4 explained above, the fallback destination system is not limited to the 4G system 300. As long as the UE 100 can autonomously select the target cell for connection and perform fallback while retaining the IMS-type communication service as the communication service, fallback can be performed to other systems.

Moreover, the block diagram used for explaining the embodiments (FIG. 2) shows a functional block diagram. Those functional blocks (structural components) can be realized by a desired combination of hardware and/or software. Means for realizing each functional block is not particularly limited. That is, each functional block may be realized by one device combined physically and/or logically. Alternatively, two or more devices separated physically and/or logically may be directly and/or indirectly connected (for example, wired and/or wireless) to each other, and each functional block may be realized by these plural devices.

Figure 9:
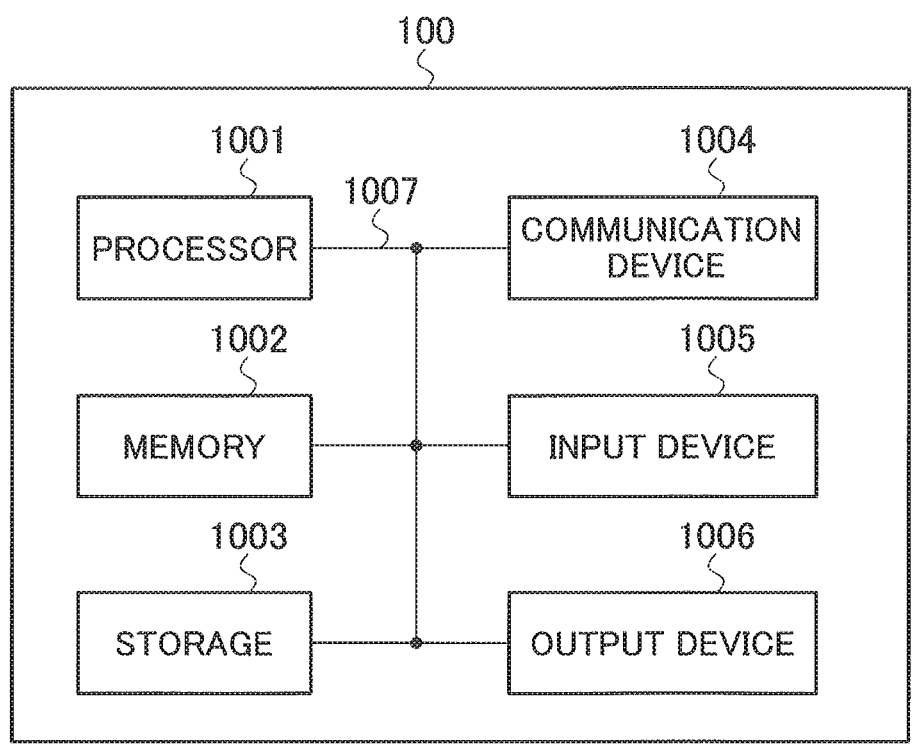
FIG. 9 is a diagram showing an example of a hardware configuration of the UE 100.

Furthermore, the UE 100 explained above can function as a computer that performs the fallback processing of the present invention. FIG. 9 is a diagram showing an example of a hardware configuration of the UE 100. As shown in FIG. 9, the UE 100 can be configured as a computer device including a processor 1001, a memory 1002, a storage 1003, a communication device 1004, an input device 1005, an output device 1006, and a bus 1007.

The functional blocks of the UE 100 (see FIG. 2) can be realized by any of hardware elements of the computer device or a desired combination of the hardware elements.

The processor 1001, for example, operates operating system to control the entire computer processor 1001 can be configured with a central processing unit (CPU) including an interface with a peripheral device, a control device, a computing device, a register, and the like.

The memory 1002 is a computer readable recording medium and is configured, for example, with at least one of ROM (Read Only Memory), EPROM (Erasable Programmable ROM), EEPROM (Electrically Erasable Programmable ROM), RAM (Random Access Memory), and the like. The memory 1002 can be called register, cache, main memory (main memory), and the like. The memory 1002 can store therein a computer program (computer program codes), software modules, and, the like that can execute the method according to the above embodiments.

The storage 1003 is a computer readable recording medium. Examples of the storage 1003 include at least one of an optical disk such as CD-ROM (Compact Disc ROM), a hard disk drive, a flexible disk, a magneto-optical disk (for example, a compact disk, a digital versatile disk, a Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

In addition, the manner of notification of information is not limited to the one explained in the embodiments, and the notification may be performed in other manner. For example, the notification of information can be performed by physical layer signaling (for example, DCI (Downlink Control information), UCI (Uplink Control Information)), upper layer signaling (for example, RRC signaling, MAC (Medium Access Control) signaling, broadcast information (NIB (Master Information Block), SIB (System information Block)), other signals, or a combination thereof. In addition, the RRC signaling can be called an RRC message, and the RRC signaling can be, for example, an RRC Connection Setup message, an RRC Connection Reconfiguration message, and the like.

Furthermore, the input/output information can be stored in a specific location (for example, a memory) or can be managed in a management table. The information to be input/output can be overwritten, updated, or added. The information can be deleted after outputting. The inputted information can be transmitted to another device.

The order of the sequences, flowcharts, and the like in the embodiments can be rearranged unless there is a contradiction.

Moreover, in the embodiments explained above, the specific operations performed by the target generation RAN and the core network can be performed by another network node (device). Moreover, functions of the target gene ration RAN and the core network can be provided by combining a plurality of other network nodes.

Moreover, the terms used in this specification and/or the terms necessary for understanding the present specification can be replaced with terms having the same or similar meanings. For example, a channel and/or a symbol can be replaced with a signal (signal) if that is stated. Also, the signal can be replaced with a message. Moreover, the terms "system" and "network" can be used interchangeably.

Furthermore, the used parameter and the like can be represented by an absolute value, can be expressed as a relative value from a predetermined value, or can be represented by corresponding other information. For example, the radio resource can be indicated by an index.

The target generation base station can accommodate one or more (for example, three) cells (also called sectors) In a configuration in which the base station accommodates a plurality of cells, the entire coverage area of the base station can be divided into a plurality of smaller areas. In each such a smaller area, communication service can be provided by a base station subsystem (for example, a small base station for indoor use Remote Radio Head).

The term "cell" or "sector" refers to a part or all of the coverage area of a base station and/or a base station subsystem that performs communication service in this coverage. In addition, the terms "base station", "cell", and "sector" can be used interchangeably in the present specification. The base station can also be referred to as a fixed station, NodeB, eNodeB (eNB), an access point, a femtocell, a small cell, and the like.

The UE 100 is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

As used herein, the phrase "based on" does not mean "based only on" unless explicitly stated otherwise. In other words, the phrase "based on" means both "based only on" and "based at least on".

Furthermore, the terms "including", "comprising", and variants thereof are intended to be inclusive in a manner similar to "having". Furthermore, the term "or" used in the specification or claims is intended not to be an exclusive disjunction.

Any reference to an element using a designation such as "first", "second", and the like used in the present specification generally does not limit the amount or order of those elements. Such designations can be used in the present specification as a convenient way to distinguish between two or more elements. Thus, the reference to the first and second elements does not imply that only two elements can be adopted, or that the first element must precede the second element in some or the other manner.

Throughout the present specification, for example, during translation, if articles such as "a", "an", and "the" in English are added, these articles shall include plurality, unless it is clearly indicated that it is not so according to the context.

As described above, the details of the present invention have been disclosed by using the embodiments of the present invention. However, the description and drawings which constitute part of this disclosure should not be interpreted so as to limit the present invention. From this disclosure, various alternative embodiments, examples, and operation techniques will be apparent to a person skilled in the art.

For example, the present invention can be applied. to a radio communication system in which a first system and a second system that support the IMS-type communication service respectively correspond to the 4G system 300 and the 5G system 200. Specifically, in the 4G cell 330 of the 4G system 300, upon detecting that the 4G core network 320 is congested, the UE 100 selects the 5G cell 230 of the 5G system 200 as the target cell for connection. Upon selecting the target cell for connection, the UE 100 transmits the connection request signal for the IMS-type communication service to the selected 5G cell 230. Alternatively, in the 4G cell 330 of the 4G system 300, when the UE 100 detects that the 4G core network 320 is congested, in a state in which the UE 100 is connected to the 4G cell 330, the UE 100 can transmit a request to the 4GRAN 310 to perform communication with the IMS 500 via the 5G core network 220 that is connected to the 4GRAN 310,

INDUSTRIAL APPLICABILITY

According to the user device explained above, the present invention is useful in that, even when performing fallback from a first system to a system other than the first system, service quality of communication that requires real time performance such as emergency calls, voice communication, and video calling can be maintained.

EXPLANATION OF REFERENCE NUMERALS

10 radio communication system
100 UE
120 connection processing unit
150 system state detecting unit
160 cell selecting unit
200 5G system
210 5GRAN
220 5G core network
230 5G cell
300 4G system
310 4GRAN
320 4G core network
330 4G cell
500 IMS

The invention claimed is:

1. A user device comprising:
a receiver that, in a state in which the user device is in an IDLE state as a radio connection between the user device and a first system, detects a state that access to the first system is barred in a first cell of the first system, the first system supporting IP multimedia subsystem-type communication service, and the first cell being formed by a first radio access network in the first system;
a processor that selects, without the user device leaving the IDLE state in which the user device has not established the radio connection with the first system, a second cell of a second system as a target cell for connection based on the state detected by the receiver that access to the first system is barred, the second system supporting the IP multimedia subsystem-type communication service, the second cell being formed by a second radio access network in the second system, and the second radio access network being a different type of radio access network from the first radio access network; and
a transmitter that transmits a connection request signal for the IP multimedia subsystem-type communication service to the target cell for connection.

2. The user device according to claim 1, wherein, even when a third system that supports a circuit switching-type communication service is available to the user device, the processor avoids selecting a third cell of the third system as a target cell for connection.

3. The user device according to claim 1, wherein the receiver receives from the first system, information that indicates whether fallback to the second system that supports the IP multimedia subsystem-type communication service or a third system that supports a circuit switching-type communication service is allowed.

4. The user device according to claim 1, wherein the processor selects, as the target cell for connection, the second cell of the second system that uses a different frequency than a frequency used by the first cell, or the second cell of the second system formed near the first cell.

5. A user device comprising:
a receiver that, in a state in which the user device is in an IDLE state as a radio connection between the user device and a first system, detects information comprising access restriction information notifying that access to the first system is barred in a first cell of the first system, the first system supporting IP multimedia subsystem-type communication service, the first cell being formed by a first radio access network in the first system;
a processor that selects, without the user device leaving the IDLE state in which the user device has not established the radio connection with the first system, a second cell of a second system as a target cell for connection based on the information detected by the receiver notifying that access to the first system is barred, the second system supporting the IP multimedia subsystem-type communication service, the second cell being formed by a second radio access network in the second system, and the second radio access network being a different type of radio access network from the first radio access network; and a transmitter that transmits a connection request signal for the IP multimedia subsystem-type communication service to the target cell for connection.

6. The user device according to claim 5, wherein the processor selects, as the target cell for connection, the second cell of the second system that uses a different frequency than a frequency used by the first cell, or the second cell of the second system formed near the first cell.

7. The user device according to claim 5, wherein the information detected by the receiver is at least one of broadcast information and a paging signal notified from the first system.

8. The user device according to claim 5,
wherein frequency information that includes information on frequency that is used in the second cell of the second system, or cell information that includes information of the second cell of the second system, is included in broadcast information broadcasted from the first system, and
the processor selects the second cell based on the frequency information or the cell information.

9. The user device according to claim 5,
wherein frequency information that includes information on frequency that is used in the second cell of the second system, or cell information that includes information of the second cell of the second system, is included in a paging signal broadcasted from the first system, and
the processor selects the second cell based on the frequency information or the cell information.

* * * * *